Patented Dec. 11, 1951

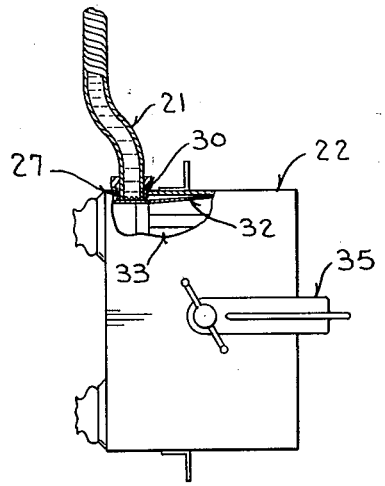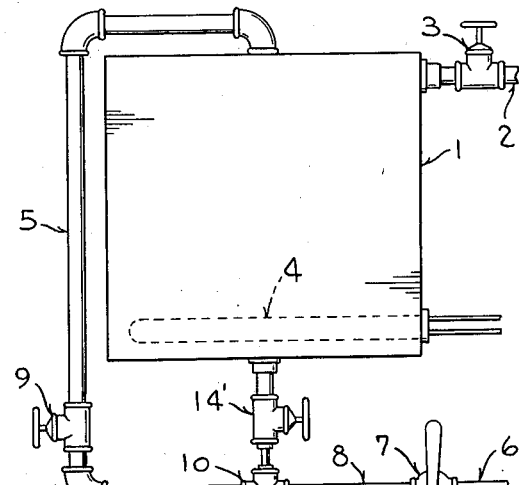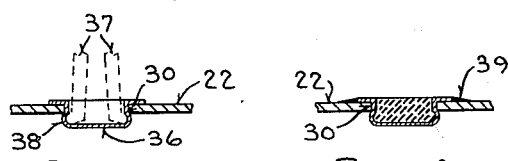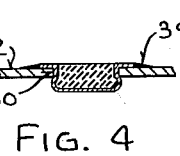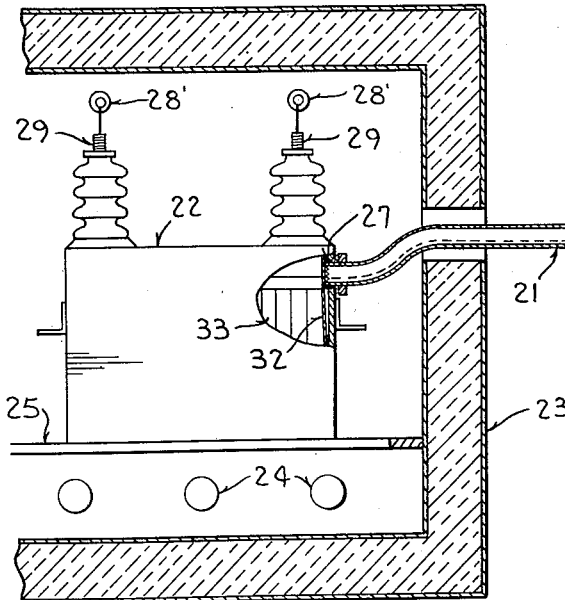

2,578,024

UNITED STATES PATENT OFFICE 2,578,024

METHOD AND APPARATUS FOR IMPREGNATING ELECTRICAL INSTRUMENTALITIES

Alwin G. Steinmayer, Milwaukee, and Edwin A. Link, South Milwaukee, Wis., assignors to McGraw Electric Company, a corporation of Delaware Application July 31, 1946, Serial No. 687,332

16 Claims. (Cl. 226—70)

This invention relates to a process and apparatus for drying and impregnating capacitors and other electrical instrumentalities which are sealed within a casing.

Heretofore, it was the usual practice to place the capacitors in an autoclave and to evacuate the autoclave while the capacitors were subjected to heat from heaters within the autoclave. This process had many objectionable features and was slow. It was impossible to determine whether or not any individual capacitor had a leaky casing and also the process of heat transfer from the exterior to the interior of the capacitor was very slow. There was very little conduction of heat due to the evacuation and consequently most of the heat absorbed by the casing of the capacitors was delivered in the form of radiant heat. In addition, there is always vacuum space between the inner walls of the casing of the capacitor and the enclosed units. This vacuum space acted as a thermal insulator and obviously there was a very slow transfer of heat across this space from the side walls of the capacitor to the enclosed units. Another factor which contributed to the slowing down of the drying process was the fact that as the moisture was drawn out by the vacuum from the units within the capacitor the temperature within the capacitor was materially reduced due to heat of vaporization and this, coupled with the slow transfer of heat from the exterior walls to the interior units of the capacitor, frequently resulted in the formation of ice within the capacitor itself, thus greatly hampering dehydration of the capacitor. In addition to these defects in the old autoclave process, all of the space within the autoclave and within the capacitors had to be evacuated.

This invention is designed to overcome the above noted defects and objects of this invention are to provide an apparatus and a process for drying and impregnating capacitors or other electrical instrumentalities in sealed casings whereby each individual capacitor is connected with a source of vacuum and is evacuated while heat is applied externally of the casing and while the air surrounding the capacitor is at atmospheric pressure to thereby cause the side walls of the capacitor to dish inwardly or bow inwardly due to the difference in the internal and external pressure, thereby resulting in intimate contact between the side walls of the capacitor and the internal units thereof so that there was a free and rapid transfer of heat from the side walls to the internally located units of the capacitor, and also so that there was direct heat conduction from the heated air surrounding the capacitor to the side walls of the capacitor and direct conduction of heat from the side walls to the internal units.

Further objects are to provide a process and an apparatus for drying and impregnating capacitors and other sealed electrical units in which a plurality of capacitors can be treated simultaneously in a continuous process method and yet in which each capacitor is individually connected to a source of vacuum and to an oil supply so that the exact condition of each capacitor may be governed and determined at all stages in the process, whereby the action of individual capacitors can be observed and controlled without in any way interfering with the drying and impregnation of the remaining capacitors.

Further objects are to provide a method and an apparatus for drying and impregnating capacitors and other sealed electrical instrumentalities in which means are provided whereby thorough drying of the capacitor takes place, and in which complete impregnation without the formation of voids anywhere in the capacitor is obtained.

Further objects are to provide a process and an apparatus for impregnating capacitors or other sealed electrical instrumentalities which may be very quickly followed and which is reliable in the results produced and which involves relatively simple and easily constructed apparatus.

Embodiments of the invention are shown in the accompanying drawings, in which—

Figure 1 is a diagrammatic view showing the apparatus, such view being partly in section.

Figure 2 is a view of a capacitor removed from the oven with parts broken away.

Figure 3 is a sectional detail showing the closure cap as it is being crimped to temporarily lock it in place.

Figure 4 is a similar view showing the closure cap soldered in place.

Figure 5 is a broken-away view of the end of one of the filling goosenecks.

Figure 6:
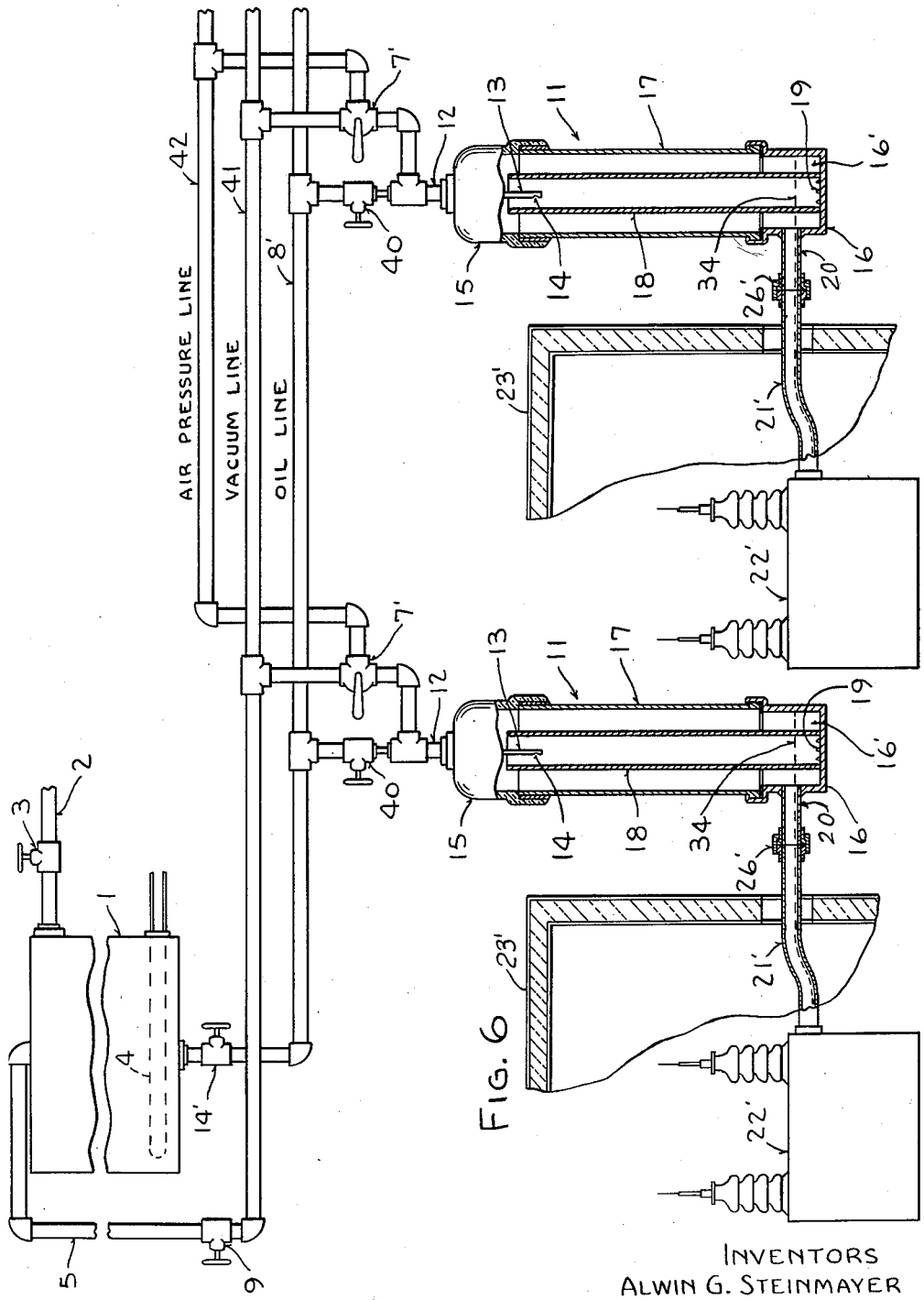
Figure 6 is a view showing how a plurality of capacitors may be processed simultaneously.

Referring to Figure 1 it will be seen that the apparatus comprises a storage tank 1 for oil or other dielectrics, the oil or other dielectrics being thoroughly degasified before it is stored in the tank 1. The storage tank is provided with a supply pipe 2 through which oil is initially supplied, the pipe being normally closed by means of a valve 3. The tank is provided with an electric heater 4 so that the oil is kept hot and is maintained under vacuum while the oil is stored therein. This is accomplished through the medium of a pipe 5 which is connected to a source of vacuum 6 through a three-way valve 7. The valve 7 may be turned so as to connect the pipe 8 with either the vacuum pipe 6 or with a pressure pipe 8', the pressure pipe 8' leading to a source of pressure, for instance air under pressure of approximately one-half pound per square inch above atmospheric pressure. The pipe 5 is provided with a valve 9 which controls communication with the pipe 5 through a T-shaped fitting 10. The fitting 10 communicates with the upper end of a vertical chamber, indicated generally by the reference character 11, by means of a pipe 12.

The lower portion of the tank 1 is connected to a small pipe 13 which extends through the fitting 10 and the pipe 12 in spaced relation to the inner walls of each of such members. Flow of oil through the pipe 13 is controlled by means of the valve 14'. The lower end of the pipe 13 is closed and a very small opening 14 is provided. The opening may be as small as one-sixteenth of an inch and opens laterally of the pipe 13. The vertical chamber 11 is composed of an upper metal portion 15 and a lower metal portion 16 to which a vertical main outer glass tube 17 is cemented in an air tight manner. This outer tube encloses an inner glass tube 18 which is provided with a series of small serrations or notches 19 in its lower edge.

Adjacent the bottom of the vertical chamber 11 a laterally extending pipe 20 is positioned and during the process of impregnation communicates with a flexible metal gooseneck pipe 21 leading to the capacitor 22, as will be described in greater detail hereinbelow. The capacitors 22 are placed within an oven 23 which is heated in any suitable manner, as by means of an electric heater 24, and preferably rest on grids 25. If desired, a fan, not shown, may be employed to circulate the air within the oven 23.

The flexible gooseneck or pipe 21 is detachably coupled in an air tight manner by means of a union 26 with the pipe 20 and is adapted to be attached or detached therefrom as required. The outer end of the gooseneck or flexible metal pipe 21 is provided with a self-tapping sleeve or fitting 27 which may, if desired, be provided with a plurality of small notches 28 in its outer end. This sleeve or self-tapping fitting 27 is soldered, brazed, or otherwise secured to the metal pipe 21 in an air tight manner.

The oven 23 is provided with a plurality of terminals 28' insulated therefrom and extending through the walls of the oven. These terminals are connected by means of jumpers with the terminals 29 of the capacitors 22 so that the electrical condition of each capacitor can be individually determined externally of the oven at all stages in the process of drying and impregnation.

It is intended that a plurality of capacitors shall be dried and impregnated simultaneously. It is, therefore, understood that a vertical chamber 11 and a suitable gooseneck 21 is provided for each of the capacitors, a single unit having been shown in the drawings.

In practicing the process, a hole 30 is cut in one of the vertical end walls of the capacitor 22 and the self-tapping fitting 27 on the flexible gooseneck 21 is screwed into such hole, a suitable gasket 31 being provided so as to insure an air tight seal with the capacitor. The capacitors are provided with metal holding members or plates 32 at their ends to hold individual units 33 of the capacitors in place. The fitting 27 extends inwardly of the capacitor a sufficient amount to slightly deflect the adjacent metal holding member or plate 32, as shown in Figure 1, and to provide a space between such metal holding member 32 and the end wall of the capacitor to allow oil to slowly flow downwardly and to build up from the bottom of the capacitor.

In practicing the process, each capacitor 22 is connected to its gooseneck 21 as described hereinabove and the gooseneck 21 is connected by means of the union 26 with the pipe 20 leading to the bottom of the vertical chamber 11. The valve 3, as stated, is permanently closed and the valve 14', is temporarily closed. The valve 7 is turned so as to connect the vacuum pipe 6 to the upper end of the vertical chamber 11 and consequently to the interior of the capacitor 22. The valve 9 is open to keep the stored liquid under vacuum. A vacuum is thus produced within the interior of the sealed capacitor 22 and the side walls of the capacitor bow inwardly due to the external air pressure. This causes the side walls to engage the individual insulated units 33 and to thus afford a free means of heat transfer by conduction from the exterior to the interior of the capacitor. As the capacitor is heated while a high vacuum is produced, for instance, an absolute pressure of one-tenth of a millimeter of mercury, it is apparent that water vapor is drawn from the interior of the capacitor. This appears as a fine mist within the vertical transparent chamber 11 and passes outwardly through the pipe 6. This process continues until the interior of the capacitor is substantially dry.

The degree of dryness is indicated by measuring the power factor of the capacitor externally of the oven 23. Before heating and exhausting of the capacitor, the power factor runs at approximately 30 per cent. When the capacitor is thoroughly dry the power factor decreases to approximately .15 per cent. When this point is reached, it is known that the capacitor is substantially dry. The heating of the capacitor is very rapid due to the contact of the side walls, which are inwardly dished by the external air pressure, against the capacitor units 33.

Heretofore the heat transfer from the exterior to the interior of the capacitor has been extremely slow when the autoclave method was followed. In the evaporation of moisture due to the vacuum from the interior of the capacitor the temperature within the capacitor falls and it has been found in the old practice that frequently the water held within the paper or other insulating medium within the capacitor freezes, thus materially interfering with the drying or dehydration of the capacitor. Also in view of the fact that in the old process there is vacuum space between the side walls and the individual units of a capacitor, it is apparent that the heat transfer from the exterior to the interior of the capacitor was extremely slow. In addition to this, in the old autoclave process there was no convection or conduction of heat to the capacitor wall as the air was exhausted from the autoclave. Consequently radiant heat alone had to be relied upon. With the present process the heat transfer from the exterior to the interior of the capacitor is very rapid and the temperature interiorly of the capacitor is sufficiently high to insure excellent drying of the capacitor under the action of heat and vacuum.

When the electrical tests indicate that the capacitor is dry, the valve 14' is opened. This allows oil to flow by gravity downwardly through the small pipe 13 and to squirt laterally from the small orifice 14 against the interior wall of the central or inner glass cylinder 18. The spraying of this oil against the inner wall of the member 18 is an additional precaution to insure degasifying of the oil, if by inadvertence it should not be fully degasified when it is stored within the tank 1. The oil flows down the interior of the inner glass tube or chamber 18 and builds up to approximately the point indicated by the reference character 34. The oil above the point 34 is somewhat frothy but the solid oil collects in the bottom of the vertical inner chamber or glass tube 18 and then flows slowly through the small notches or serrations 19 filling the well 16' with clear liquid until the level reaches the bottom of tube 20 at which time the liquid overflows from the well 16', through the tube 20 and the gooseneck 21, into the capacitor 22 and downwardly between the member 32 and the end wall of the capacitor to the bottom of the capacitor and builds up in the bottom to the top of the capacitor. While oil is flowing through the bottom portion only of the gooseneck 21 and pipe 20 there is a flow of rarefied air from the capacitor through the gooseneck 21 and pipe 20 in the reverse direction to the flow of oil. The oil continues to flow slowly into the capacitor and to fill it, as stated, from the bottom to the top. The oil will fill the capacitor clear up to the top beyond the point at which the gooseneck is attached as the interior of the capacitor is maintained under vacuum during this process.

It is usual in this process to stop the heating of the oven at the time the hot oil is admitted. There is enough residual heat in the capacitor in addition to that furnished by the heated oil to maintain the capacitor in a heated condition while the oil is flowing into it. While the capacitor is being filled with oil, its capacity is measured electrically externally of the oven 23 and it will be found that its capacity rises to a maximum at the time the filling of the capacitor approaches completion. After the capacitor is fully filled with oil, the oil is still allowed to flow into the vertical composite chamber 11 and builds up both inside and outside of the inner tube 18. This oil flow is continued until the tubes 17 and 18 are almost completely filled with oil. Thereafter the flow of oil is stopped by closing the valve 14'. The valve 9 is then closed. Thereafter the vacuum is slowly broken and air under a slight pressure of about one-half pound per square inch is allowed to slowly flow past the valve 7 through the fitting 10 into the vertical chamber 11, to thus finally apply a slight pressure against the upper surface of the oil in the vertical chamber 11. This slight pressure insures the outward snapping motion of the side walls of the capacitor 22. Ordinarily the side walls of the capacitor 22 will spring outwardly to their initial position due to their resiliency. However, although all of the capacitors have flexible side walls it has occasionally been found that some of the capacitors do not have sufficient resiliency in their side walls to return them to their initial position. To insure the return to their initial position, a slight amount of pressure, hereinabove described, is employed merely as a precautionary measure.

After the capacitor has cooled sufficiently the union 26 is opened and the capacitor with its gooseneck 21 is removed from the oven and turned up on its end as shown in Figure 2. There is, therefore, a column of oil maintained in the gooseneck 21, the capacitor itself being completely filled with oil. While it is in this position, as shown in Figure 2, the gooseneck is removed by unscrewing the fitting 27 from the capacitor. A C-clamp 35, see Figure 2, is positioned about the capacitor and a slight pressure is put on the side walls thereof to cause a slight overflow of oil at the opening 30. A dished metal closure cap 36, see Figure 3, is inserted in the hole 30 and by means of outwardly opening crimping tongs 37, small crimps 38 are formed on opposite sides of the cap, to thus lock the cap temporarily mechanically in place. Thereafter the cap is soldered in place as indicated at 39 in Figure 4, and if desired the entire interior of the cap may be filled with solder and the whole mass smoothed off so as to give a substantially flush finish with the adjacent surface of the capacitor. The purpose of the C-clamp is to insure a slight overflow of oil and to thereby prevent the entrance of any air whatsoever during the insertion of the closure cap 36.

It is preferable to preheat the capacitors in an air oven to a temperature of approximately 90° C. for sixteen hours. Thereafter the capacitor is placed in the oven 23 and the heat and vacuum are applied for twenty-four hours. The temperature in the oven is maintained between 90° C. and 100° C. In this period of time, the capacitor is completely dry. While the vacuum is still applied the oil is allowed to flow slowly into the capacitor to impregnate and fill the capacitor. This operation takes approximately eight hours. These figures give a total of two days for the complete drying and impregnating of the capacitor. This is sharply contrasted with the old autoclave method requiring approximately four days. In addition to this, the old autoclave method made it impossible to determine whether or not any individual capacitor had a leak therein. With the present method, the action of the liquid in the transparent vertical chamber 11 indicates whether or not a particular capacitor has a leak and this particular capacitor can be instantly identified and removed without disturbing any of the remaining capacitors.

It is to be understood that the preheating may be dispensed with if desired and the capacitor may be placed within the oven 23 and the preheating and evacuation may take place immediately.

While oil has been described as the dielectric employed in the impregnating process, it is to be understood that any other suitable dielectric can be used, whether this dielectric is a liquid when heated and a liquid at ordinary temperatures, or a liquid when heated and a solid at ordinary temperatures.

As a matter of fact, it is preferable to test each individual capacitor for leaks after the gooseneck has been applied and before it is heated. Even with this testing, there is a further and certain test as described hereinabove by the action of the oil or other dielectric in the vertical chamber 11 during the impregnating process.

It is to be noted that there is the double flow in reverse directions through the gooseneck for each capacitor, the oil flowing along the bottom of the gooseneck and the rarefied air passing outwardly along the upper portion of the gooseneck. Communication with the vacuum source is had through the space between the inner glass tube 18 and the outer glass tube 17 of the vertical chamber 11, the oil while impregnation is taking place only partly filling the inner glass tube 18 as described hereinabove.

The figures given hereinabove are merely those relating to one particular installation where this process has been employed and are not intended in any way to serve as a limiting factor in this disclosure.

In practicing this invention, it has been found that better heating and better vacuum is produced. The only space required to be evacuated is the interior of the individual capacitor itself. The better heating is obtained due to the elimination of the space between the insulating units of the capacitor and its metal side walls due to the inward dishing of the side walls of the capacitor. These side walls, as described hereinabove, are held in intimate contact with the interior units of the capacitor by the difference in pressure between the external air pressure and the internal vacuum. In addition to the above, there is a direct conduction of heat from the air within the oven 23 to the side walls of the capacitors as there is no exhaustion of air from the oven 23. Obviously the oven can be electrically heated, or gas heated, or heated in any other manner desired.

This invention also provides for ease in the handling of the capacitors. The processed capacitors can be easily removed and replaced by unprocessed capacitors on a substantially continuous run basis. In addition there is the minimum of disturbance of the capacitor itself as only one hold is required in the capacitor tank or casing into which the self-tapping fitting is temporarily screwed. The flexible gooseneck with its self-tapping fitting constitutes a conducting means for simultaneously conducting the rarefied air or vapor outwardly from the casing and conducting the dielectric inwardly into the casing. This hole, as described hereinabove, is subsequently permanently closed in an air tight manner. A more thorough drying and thorough impregnation is secured by this invention.

It is to be noted particularly that by guiding the oil downwardly to the bottom of the capacitor between the holding member 32 and the end wall of the capacitor, no air is trapped below the oil as might be the case had the oil spread all over the top of the units of the capacitor and thereafter settled downwardly. With the present process there are no voids whatsoever in the finished impregnated capacitor.

In addition to the above features, this process greately reduces the time required for complete drying and impregnation of capacitors.

In the form of the invention shown in Figure 6 the same principle is followed except that provision is made for the simultaneous treatment of a plurality of capacitors.

Referring to Figure 6, it will be seen that the same units 11 have been employed as that previously described. These units are connected through the coupling 26' to the goosenecks 21' of the respective capacitors 22'. A common oil line 8' is provided for all of the units 11. This oil line is closed at its outer end in any suitable manner, not shown. The flow of oil to each unit is individually controlled by the valves 40 which supply the units 11 with oil. A common vacuum line 41 is provided and a common air pressure line for air slightly above atmospheric pressure is also provided and indicated by the reference character 42. Three-way valves 7' are provided for each of the individual units 11.

In Figure 6 two fragments of the oven are indicated at 23'. It is to be distinctly understood though that the capacitors 22' are placed within an oven as previously described and the terminals of the capacitors are electrically connected to instruments exteriorly of the oven as previously described. The process is identically the same for each individual capacitor. However, it is to be noted that a plurality of capacitors may be simultaneously treated and yet each individual capacitor is under separate control and may be detached and removed from the system without disturbing the operation of the system with reference to the other capacitors. In this way if any capacitor should be found defective during the processing, it can be individually removed and a new capacitor substituted without disturbing any other portion of the system and without interrupting the process for the other capacitors. In addition to this, if for instance any individual capacitor should be leaking, it is apparent that the action of the oil or other liquid in its corresponding unit 11 will indicate such a condition.

It is also within the province of this invention to provide a single control for the oil line to all of the capacitors and a single control on the vacuum and air pressure lines so that all of the capacitors may be simultaneously controlled, if so desired.

It will be seen, therefore, that the invention is equally applicable to the simultaneous treatment of a plurality of capacitors as it is to the treatment of a single capacitor. In addition to this, the various capacitors or various groups of capacitors may be removed when their processing is completed and a new capacitor or new group of capacitors may be substituted without interrupting the processing of the remaining capacitors. In this way a continuous operation may be obtained so that the apparatus may be run fully loaded at all times without any interruption whatsoever for the entire apparatus.

While the description and drawings have been directed to the drying and impregnating of capacitors, it is to be distinctly understood that the invention is not so limited. It may be applied to the drying and impregnating of any electrical equipment where the electrical instrumentality is hermetically enclosed in a metal or other type of envelope or tank so that an interior vacuum may be drawn and while the dehydration is taking place and subsequently while impregnation is taking place. For example, this process can be applied to the drying and impregnation of transformers which are hermetically sealed in metal tanks or cases.

Although this invention has been described in considerable detail, it is to be understood that such description is intended as illustrative rather than limiting, as the invention may be variously embodied and is to be interpreted as claimed.

We claim:

1. The method of impregnating a capacitor having internal units and an external slightly yielding and self-restoring casing, said method comprising evacuating the interior of said casing while air pressure acts on the outer side of said casing to cause the walls of said casing to bow inwardly and bear firmly against said internal units and simultaneously applying heat to the exterior of said capacitor, and subsequently maintaining the interior of the casing evacuated and causing a dielectric to flow into the casing.

2. The method of impregnating a capacitor having internal units and an external slightly yielding and self-restoring casing, said method comprising forming a hole in the casing of said capacitor and connecting the casing through said hole to a source of vacuum to thereby produce and maintain a vacuum within said casing, subjecting the outside of said casing to pressure to cause the walls of said casing to collapse against the interior units of said capacitor and simultaneously applying heat exteriorly of said casing for direct conduction of heat to said units, subsequently causing a dielectric to flow into said casing while vacuum is maintained in said casing, relieving the vacuum, and sealing said hole.

3. The method of impregnating a capacitor having internal units and an external slightly yielding casing, said method comprising forming a hole in the casing of said capacitor and connecting the casing through said hole to a source of vacuum to thereby produce and maintain a vacuum within said casing, subjecting the outside of said casing to pressure to cause the walls of said casing to collapse against the interior units of said capacitor and simultaneously applying heat exteriorly of said casing for direct conduction of heat to said units, subsequently causing a dielectric to flow into said casing while vacuum is maintained in said casing, relieving the vacuum and causing pressure to build up within said casing to thereby cause the walls to move outwardly away from said internal units, and sealing said hole.

4. An apparatus for impregnating an encased electrical instrumentality comprising an oven for the reception of said electrical instrumentality, means providing temporary communication with the interior of the casing of the electrical instrumentality, means for producing a vacuum within the casing through said first mentioned means, and means for conducting a dielectric into the casing through said first mentioned means while the vacuum is maintained through said first mentioned means.

5. An apparatus for impregnating electrical instrumentalities encased in flexible walls, said apparatus comprising an oven for receiving said electrical instrumentalities with the exterior of the casings of said electrical instrumentalities subjected to air pressure, means for producing a vacuum within the casings of said electrical instrumentalities to remove air and moisture and to cause said walls to bow inwardly into contact with said electrical instrumentality for direct heat transfer and means for conducting a dielectric into the casings of said electrical instrumentalities while said encased electrical instrumentalities remain in said oven and while vacuum is maintained within the casings of said electrical instrumentalities and while said walls are bowed inwardly into contact with said electrical instrumentality.

6. An apparatus for impregnating an encased electrical instrumentality comprising storage means for storing a degasified dielectric, conducting means providing a temporary communication with the interior of the casing of the electrical instrumentality, means for supplying heat externally of said electrical instrumentality, means for producing a vacuum through said conducting means within the casing of said electrical instrumentality, and means for simultaneously conducting the degasified dielectric from said storage means through the lower portion only of said conducting means into the casing of said electrical instrumentality while the vacuum is being maintained through the upper portion of said conducting means.

7. An apparatus for impregnating an encased electrical instrumentality comprising storage means for storing a degasified dielectric, conducting means providing a temporary communication with the interior of the casing of the electrical instrumentality, means for supplying heat externally of said electrical instrumentality, means for producing a vacuum through said conducting means within the casing of said electrical instrumentality, means for simultaneously conducting the degasified dielectric from said storage means through the lower portion only of said conducting means into the casing of said electrical instrumentality while the vacuum is being maintained through the upper portion of said conducting means, and means for maintaining a vacuum within the storage means.

8. An apparatus for impregnating an encased electrical instrumentality comprising storage means for storing a degasified dielectric, conducting means providing temporary communication with the interior of the casing of the electrical instrumentality, said storage means being located at a point above the electrical instrumentality, means for heating the electrical instrumentality by supplying heat to the exterior of the casing of said electrical instrumentality, means for producing a vacuum within the casing of the electrical instrumentality through said conducting means while heat is supplied externally of the casing of the electrical instrumentality, and transparent means providing communication between the storage means and the conducting means for leading the degasified dielectric through said conducting means into the casing of the electrical instrumentality, said transparent means allowing the condition of the dielectric passing therethrough to be observed, whereby any leaks in the casing of said electrical instrumentality will be indicated.

9. An apparatus for impregnating an encased electrical instrumentality comprising heating means for heating the electrical instrumentality by supplying heat exteriorly of the casing of said electrical instrumentality, conducting means providing a temporary communication with the interior of the casing of said electrical instrumentality, storage means located at a point above said electrical instrumentality for storing a dielectric, means for producing vacuum within the casing of said electrical instrumentality through said conducting means, a vertical chamber interposed between said storage means and said conducting means, and an apertured member arranged to allow gravity flow of the dielectric downwardly and arranged to project the dielectric against a wall of said vertical chamber.

10. An apparatus for impregnating an encased electrical instrumentality comprising heating means for heating said electrical instrumentality, supply means for supplying a dielectric, conducting means providing temporary communication with the interior of the casing of said electrical instrumentality, means establishing communication between the supply means and the conducting means and including an outer vertical transparent tubular member and an inner vertical transparent tubular member shorter than said outer transparent tubular member, means for producing a vacuum within the casing of said electrical instrumentality and through the outer vertical tubular member and the conducting means, and means communicating with the supply means for spraying the dielectric against the inner wall of the inner vertical tubular member, said inner vertical tubular member having means adjacent its bottom portion providing for the slow flow of dielectric to said conducting means.

11. An apparatus for impregnating a capacitor having a casing provided with flexible side walls and having internal units normally spaced from the side walls of said casing, said apparatus comprising conducting means providing temporary communication with the interior of the casing of said capacitor, means for causing a difference in pressure between the interior and exterior of the capacitor to cause the side walls to partially collapse and engage the internally located units, means for supplying heat exteriorly of said capacitor while the side walls are in engagement with the interiorly located units for direct conduction of heat to said units, and means for conducting a dielectric into the casing of said capacitor while the vacuum is maintained within the casing of the capacitor.

12. An apparatus for impregnating a capacitor having a casing provided with flexible side walls and having internal units normally spaced from the side walls of said casing, said apparatus comprising conducting means for providing temporary communication with the interior of the casing of said capacitor, means for producing a vacuum through said conducting means within the casing of said capacitor and arranged to cause partial collapse of the flexible side walls of the capacitor against the internal units, means for supplying heat externally of the casing of said capacitor while the side walls are in engagement with the internal units for direct conduction of heat to said units, and means for conducting a dielectric into the casing of said capacitor while vacuum is maintained within the casing of the capacitor.

13. An apparatus for impregnating a capacitor having a casing provided with flexible side walls and having internal units normally spaced from the side walls of said casing, said apparatus comprising conducting means for providing temporary communication with the interior of the casing of said capacitor, means for producing a vacuum through said conducting means within the casing of said capacitor and arranged to cause partial collapse of the flexible side walls of the capacitor against the internal units, means for supplying heat externally of the casing of said capacitor while the side walls are in engagement with the internal units for direct conduction of heat to said units, and means for conducting a dielectric into the casing of said capacitor through said conducting means while vacuum is maintained within the casing of the capacitor, said conducting means being detachable from the remainder of the said apparatus, whereby said capacitor may be removed together with the conducting means and whereby said conducting means will act as a temporary reservoir for the dielectric.

14. An apparatus for simultaneously impregnating a plurality of capacitors having casings enclosing internal units, said apparatus comprising an oven for receiving a plurality of capacitors with the exterior of the casings subjected to air pressure, a source of vacuum, a vacuum line, a line for dielectric material maintained under vacuum, means for placing the interior of said casings in communication with the vacuum line to cause the walls of the casings to move inwardly against the internal units whereby heat is transmitted by conduction from the walls of the casings to the internal units while vacuum is maintained within said casings, means for connecting the dielectric line to said casings whereby dielectric material is caused to flow into said casings while vacuum is maintained within said casings, means for stopping the dielectric flow, and means for relieving the vacuum and producing pressure within said casings.

15. An apparatus for simultaneously impregnating a plurality of capacitors having casings enclosing internal units, said apparatus comprising an oven for receiving a plurality of capacitors with the exterior of the casings subjected to air pressure, a source of vacuum, a vacuum line, a line for dielectric material maintained under vacuum, means for placing the interior of said casings in communication with the vacuum line to cause the walls of the casings to move inwardly against the internal units whereby heat is transmitted by conduction from the walls of the casings to the internal units while vacuum is maintained within said casings, connecting means for allowing individual capacitors to be tested for capacitance and power factor during drying, means for connecting the dielectric line to said casings whereby dielectric material is caused to flow into said casings while vacuum is maintained within said casings, means for individually stopping the dielectric flow to any selected capacitor without disturbing the dielectric flow to the remaining capacitors, and means for individually relieving the vacuum for the selected capacitor without disturbing the vacuum within the other capacitors.

16. An apparatus for simultaneously impregnating a plurality of capacitors having casings enclosing internal units, said apparatus comprising an oven for receiving a plurality of capacitors with the exterior of the casings subjected to air pressure, a source of vacuum, a vacuum line, a line for dielectric material maintained under vacuum, means for placing the interior of said casings in communication with the vacuum line to cause the walls of the casings to move inwardly against the internal units whereby heat is transmitted by conduction from the walls of the casings to the internal units while vacuum is maintained within said casings, means including a transparent portion for connecting the dielectric line individually to said casings whereby dielectric material is caused to flow into said casings while vacuum is maintained within said casings, the said transparent portion allowing an operator to observe any disturbance in the flow of dielectric material due to a leak for any individual capacitor, means for stopping the dielectric flow independently for each individual capacitor, and means for independently relieving the vacuum for each capacitor.

ALWIN G. STEINMAYER.
EDWIN A. LINK.

REFERENCES CITED

The following references are of record in the file of this patent:

UNITED STATES PATENTS

| Number | Name | Date |
|---|---|---|
| 284,226 | Patterson | Sept. 4, 1883 |
| 917,018 | Dempster | Apr. 6, 1909 |
| 1,974,918 | Hanson | Sept. 25, 1934 |
| 2,047,260 | Franklin | July 14, 1936 |
| 2,058,846 | Waterman | Oct. 27, 1936 |
| 2,126,532 | Gate | Aug. 9, 1938 |
| 2,423,647 | Gurvitch | July 8, 1947 |